G. A. SHIELDS.
COMBINED GLASS MACHINE.
APPLICATION FILED APR. 11, 1918.
1,310,451.
Patented July 22, 1919.
3 SHEETS—SHEET 1.
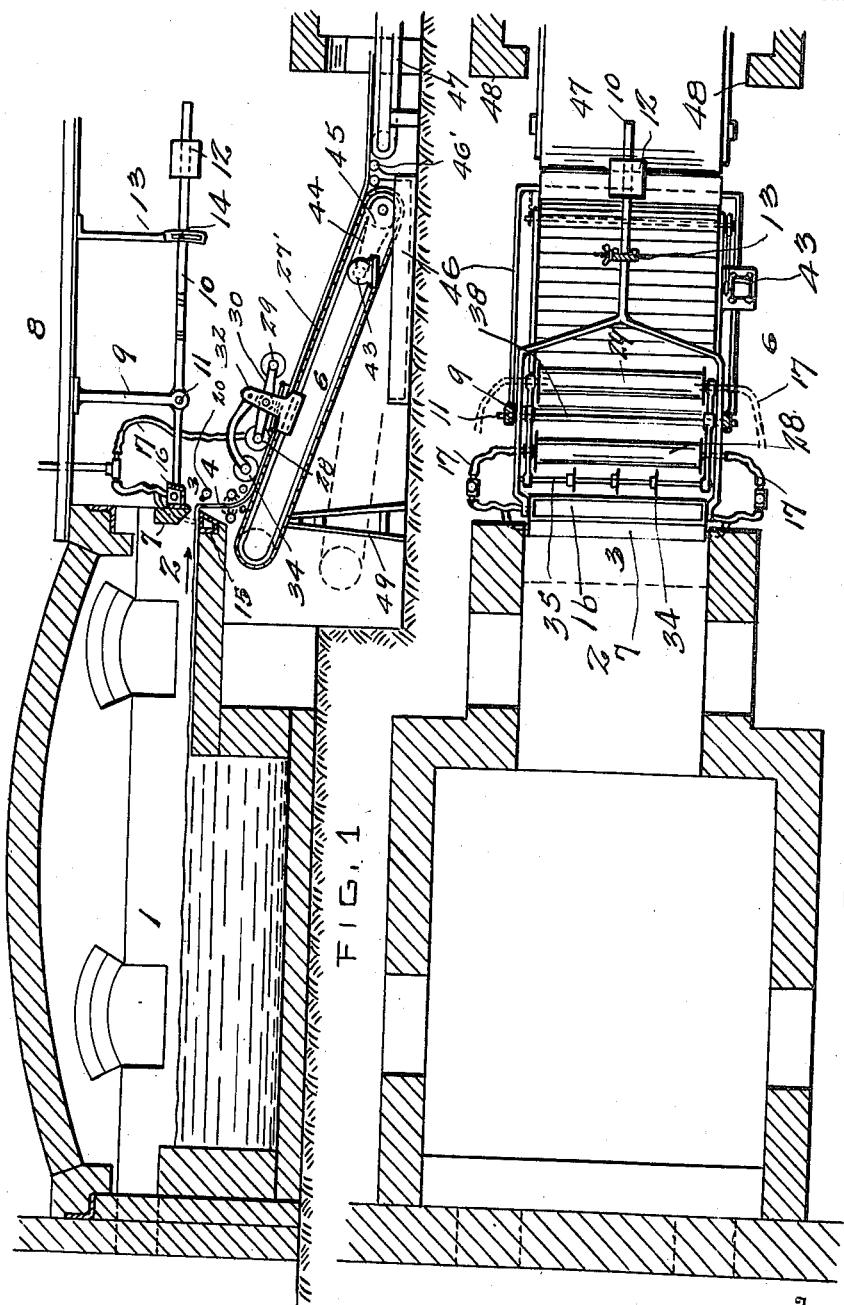
Inventor
GEORGE A. SHIELDS
By Shigley & Harney
Attorneys G. A. SHIELDS.
COMBINED GLASS MACHINE.
APPLICATION FILED APR. 11, 1918.
1,310,451.
Patented July 22, 1919.
3 SHEETS—SHEET 2.
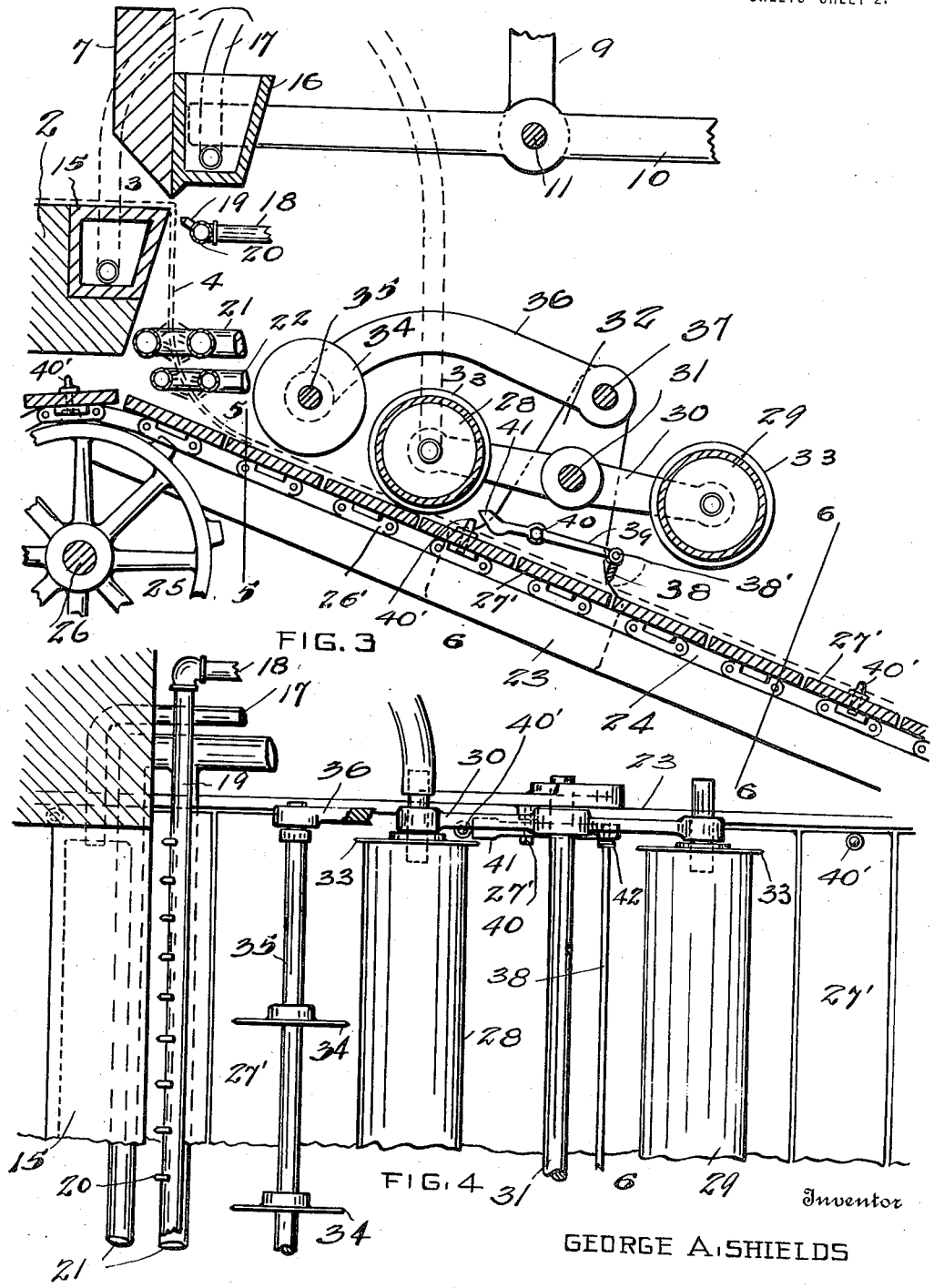
GEORGE A. SHIELDS
By Shigley & Harney
Attorneys

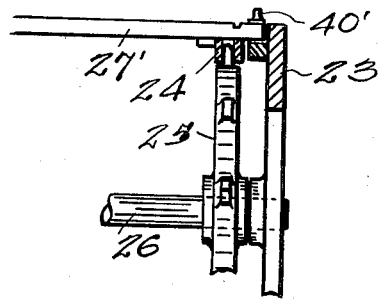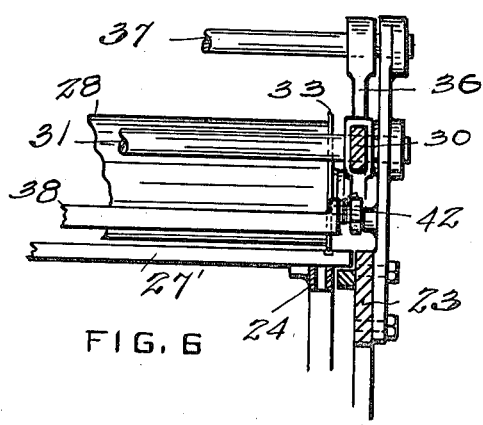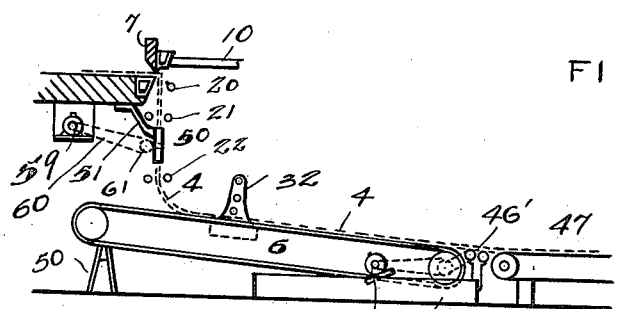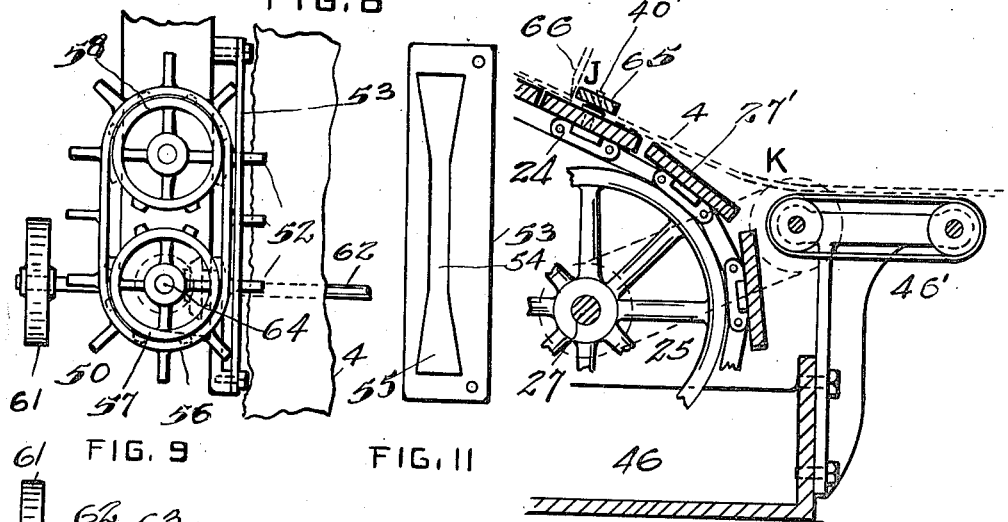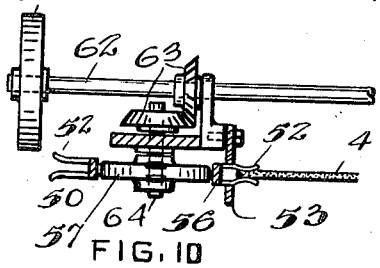

UNITED STATES PATENT OFFICE.

GEORGE A. SHIELDS, OF COLUMBUS, OHIO, ASSIGNOR TO CYRUS H. MARTIN AND BLANCH A. MARTIN, BOTH OF COLUMBUS, OHIO.

COMBINED GLASS-MACHINE.

1,310,451.    Specification of Letters Patent.    Patented July 22, 1919.

Application filed April 11, 1918. Serial No. 227,978.

*To all whom it may concern:*

Be it known that I, GEORGE A. SHIELDS, a citizen of the United States of America, residing at Columbus, in the county of Franklin and State of Ohio, have invented certain new and useful Improvements in Combined Glass-Machines, of which the following is a specification.

The present invention relates to an improved combined glass machine in which plate or sheet glass is flattened and cut or marked, as by scoring, while in molten condition as it emerges from the delivery or discharge mouth of the tank-furnace in which the glass is melted, and the thickness of the plate or sheet of glass is determined and regulated by means of an adjustable gate or barrier which may be moved to govern the discharge of the melted glass from the furnace tank. The quality of the glass, as to its transparence, is also governed by mechanical means including a conveyer, which by its position with relation to the discharge opening of the tank furnace causes the molten glass to "drop" or flow vertically a short distance when making translucent or non-transparent glass as used in green houses, factory buildings, etc. When making higher grate plate or sheet glass the drop or vertical flow of the molten glass from the tank furnace is longer, and the transparency of this glass is of higher grade.

The invention consists essentially in certain novel combinations and arrangements of parts in which the molten glass, as it emerges from the tank furnace is spread into a sheet or plate of predetermined thickness, conveyed to the annealing oven, and incidentally scored, marked or cut, and also trimmed while on the conveyer, as will be hereinafter more particularly pointed out.

Figure 1 shows a section of a glass making tank furnace of usual type having the regulating gate and conveyer mechanism of my invention applied thereto, and shown in vertical section and side elevation.

Fig. 2 is a horizontal plan view of the furnace tank in section with the conveyer and cutting apparatus of the invention in top plan.

Fig. 3 is an enlarged, vertical sectional view of the gate part of the invention, showing also a part of the sheet glass conveyer, the longitudinal marker or cutter and the transverse cutter.

Fig. 4 is a top plan view of a portion of the machinery of Fig. 3.

Fig. 5 is a detail sectional view of the conveyer at line 5—5 of Fig. 3.

Fig. 6 is a similar sectional detail at line 6—6 of Fig. 3.

Fig. 7 is a vertical sectional view of the lower end of the conveyer, showing also an intermediate conveyer.

Fig. 8 shows the conveyer in changed position in relation to the opening of the tank, to make a longer drop for the glass sheet, as when preparing plate or sheet glass of high quality.

Fig. 9 is a detail view of a feeder employed, one at each edge of the sheet of molten glass, when using a long drop for the glass.

Fig. 10 is an edge view of the feeder and guide device of Fig. 9.

Fig. 11 is a plan view of one of the actuating plates for the clamping fingers of the feeder.

The furnace tank 1 in which the melted glass is prepared is of usual type and provided with a trough 2 and discharge or delivery opening 3 for the molten metal, which latter is represented as filling the tank and overflowing over the trough and through the opening in a sheet 4 Fig. 1 and dotted lines Figs. 3, 7, and 8. The glass is melted in the tank in the usual manner, and flows out of the trough and drops down upon an endless conveyer indicated as a whole by the numeral 6, where it is marked or cut, and travels directly to the annealing oven or leer.

The thickness of the glass sheet or plate is determined and regulated by the heat of the tank and at the mouth of the tank, and this is accomplished through the use of an adjustable gate 7, which extends transversely across the opening at the end of the trough and is vertically adjustable and suspended by means of the frame 8 which is supported partly on the structure of the furnace. A bracket 9 depends from the frame 8 and the gate beam 10 of the gate is pivoted to this bracket at 11, a counterweight 12 being adjustable on the beam, and the slotted bracket 13 and pin 14 being employed to guide the movement of the beam.

The gate is vertically movable in the opening 3, and a water cooled sill 15, hollow and lined with fire-clay is placed at the end of the trough and at the opening 3, over which the molten metal flows and bends, the gate itself also being provided with water-cooled members as 16, receiving water through the hose 17. The material for the glass is fed into the furnace tank in the usual manner, and preferably at the same rate that it is allowed to flow through the outlet opening 3, in order to maintain a continuous flow of metal of high grade, and of the thickness desired. It will readily be seen that the thickness of the sheet as it emerges from the furnace tank is determined and regulated by the distance of the gate above the sill of the trough, the greater the altitude, the greater the thickness of the metal. Preferably I employ a heating device at the mouth of the tank to maintain the glass at a high temperature at this point, gas being supplied through the pipe 18 and blown through the nozzles 19 on the glass, from the burner 20.

Before passing over the conveyer, the molten sheet of glass is partially cooled, and for this purpose air pipes 21 are first encountered which furnish cooling drafts of air as the sheet passes between the pipes, and then the pair of water pipes 22 are encountered from which water is sprayed at the front and back of the sheet of glass, to further cool it.

The sheet or plate of glass drops or flows vertically from the opening through the heating and cooling devices, and then rides down the endless conveyer 6, upon which it is supported, and conveyed toward the annealing oven or leer. The conveyer is made up of the side bars or frame 23 and is provided with endless chains 24 which pass around the two sets of upper and lower sprocket wheels 25, the former on the shaft 26 and the latter on the shaft 27 journaled in the side bars or frame 23. The sprocket chains are connected by the closely arranged transverse slats 27', preferably of wood, and attached, as by brackets 26' to the chains to form a flexible, endless conveyer for the sheet or plate of glass, the upper flight of the conveyer, of course traveling away from the furnace tank. The sheet of glass is conveyed and supported by the wooden slats of the conveyer, and is guided by the water cooled rollers 28 or 29, one of, which is used while the other is being cooled. These rollers are journaled on the oscillatable frame 30 pivoted at 31 in the brackets 32 at the edges of the conveyer frame and it will be apparent that the rollers, by their weight will guide and hold sheet of glass on the conveyer. At each end of each roller is provided a cutting disk or ring 33 which is designed to trim and cut away the edges of the sheet of glass as it passes under the rollers, the cutters, of course revolving with the water cooled rollers, and cutting the uneven or irregular strip from the edges of the sheet.

In addition to the edge trimmers, a number of cutting disks or scorers 34 are employed to score or mark the sheet glass, longitudinally, as it passes over the conveyer. These markers are adjusted to proper position on the transverse shaft 35, revolubly supported in the pivoted arms 36 that are loosely journaled on the transverse bar 37 supported in the brackets 32. The cutting disks are held to their work by gravity, and as the sheet glass passes beneath the cutters, it is scored or marked, longitudinally, by a continuous line or lines, depending upon the number of disks 34 employed.

In addition to the longitudinal cutting or marking of the glass, a transverse cutter 38 is employed, to cut the sheet into plates, and this cutter, in the case of low grade or translucent sheets, is automatic in its operation and actuated by the movement of the endless conveyer. The cutter bar or knife 38 is pivotally supported at its ends in the side levers 39 which levers are pivoted at 40 in the brackets 32, and these levers are arranged at the edges of the conveyer so that the equally spaced pins or tappets 40' along the edge of the conveyer and attached to the slats 27', may encounter the cam arm 41 of the lever or levers to actuate the cutting knife. Thus, at regular intervals that have been predetermined by the arbitrary arrangement of the tappets, the transverse knife is actuated and embedded in the sheet of glass to mark or cut it or score it into plates, the longitudinal lines of which are indicated by the cutters 33 and 34. In Fig. 3 it will be seen that the knife 38 is pivoted at 38' so that it may swing with the movement of the sheet of glass, as indicated in the dotted line arc, in order to free the knife from the glass and to prevent marring of the cut as would be the case if the cutter blade were rigidly supported on the lever arms. A spring or springs, indicated at 42, are employed to return the cutter blade to perpendicular position with relation to the sheet of glass after the tappet rides from under the cam end 41 of the lever 39, so that the cutter is ready for the next cutting operation.

The conveyer is driven from the motor indicated at 43 in Fig. 1 through the belt 44 and pulley 45, and the heated wooden slats 27' are cooled as they pass through water in the tank 46 at the lower end of the conveyer.

From the conveyer, the cut or marked plates of glass, are transferred by the auxiliary or intermediate conveyer 46' to the conveyer 47 in the leer or oven 48 where the plates are further treated or annealed.

In the arrangement thus far described the conveyer 6 is located with its upper end in close relation to the mouth of the furnace tank so that the molten metal does not have a long drop, but does have a short drop before encountering the conveyer, and this short drop is used in making the cheaper grade of glass or translucent glass, as before stated.

When more transparent glass is desired, the conveyer, which is adjustably supported on the frame 49 as in Fig. 1, is moved farther away from the mouth of the furnace tank, and a smaller supporting frame 50 is used, or the upper end of the conveyer may be lowered on the same frame 49 and fixed in the desired lower position, but still maintaining sufficient inclination to the conveyer to carry or convey the sheet or plates of glass to the leer.

The glass as shown in Fig. 8 falls or flows a much greater distance from the furnace tank to the conveyer, than in Fig. 1, and this passage of the sheet through the intervening space renders it more transparent. The automatic cutting of the sheet is also dispensed with in this arrangement for providing high grade plate glass, and a guiding device, as 50′, one at each side of the sheet is employed to guide the sheet and maintain it in its flat position as it drops onto the conveyer 6. These guiding devices are supported on brackets 51 beneath the opening of the tank, and comprise clamp fingers 52, arranged in pairs, that pass through the slotted guide plates, one of which is shown as 53, in Fig. 11, and as the narrow path 54 of the slot 55 is traveled through by the fingers they are compressed and clamped along the edge of the moving sheet. The clamping fingers are carried on endless chains 56 on the sprocket wheels 57 and 58 and power is conveyed from a small motor 59 supported under the tank through a belt 60 to pulley 61 on shaft 62 of the guiding device, and thence through the bevel gears 63 to the actuating shaft 64 of the device. The clamp fingers, of course, move synchronously with the sheet of glass, and as indicated in Fig. 9, a number of the fingers are in operative contact with the edge of the glass at all times, and at opposite edges of the glass sheet, to guide the sheet and to prevent its warping, twisting or otherwise being disarranged.

After the sheet of glass has been marked into plates it will readily break, so that when the sheet passes over the space at K Fig. 7 between the conveyer 6 and the intermediate conveyer 46′, it is broken into plates and these plates then pass directly into the leer or annealing oven.

In Fig. 7 at J, the hand cutting operation is indicated, wherein a guiding bar or "ruler" 65 with holes near its ends is slipped over the oppositely arranged tappets 40′ and then with the scoring or marking knife 66 (dotted lines Fig. 7,) the sheet is scored into plates and the scored sheet breaks into plates as the sheet passes over the space K before described.

What I claim is:—

1. The combination with the supporting conveyer for sheet glass, of a transversely arranged, pivoted, support above the sheet glass, and a knife blade pivoted in the support, and means carried by the conveyer for automatically moving the support to cause the pivoted knife to engage the surface of the sheet glass, and swing with the movement of the glass.

2. The combination with the supporting conveyer for sheet glass and spaced tappets on said conveyer, of a pivoted frame in the path of movement of the tappets, and a transversely arranged knife blade pivoted in said pivoted frame above the glass and adapted when in engagement with the sheet glass, to swing with the moving glass.

3. The combination with a pair of conveyers for sheet glass, of a pivoted frame and spaced disks supported in the frame for longitudinally scoring the surface of the glass sheet, a second pivoted frame and means on the first conveyer for tilting this frame, a transverse scoring knife in the second frame, and said conveyers so spaced that the scored sheet will break on the passage thereof from one conveyer to the other.

4. The combination with the delivery trough of a glass furnace tank, of a conveyer adapted to receive the sheet flowing therefrom, synchonously moving endless chains having clamp fingers to guide the sheet and automatic means including a slotted actuating plate coacting with the fingers for causing said fingers to engage the edges of the sheet and subsequently to be disengaged therefrom.

In testimony whereof I affix my signature.

GEORGE A. SHIELDS.